(12) United States Patent
Kato et al.

(10) Patent No.: US 11,897,496 B2
(45) Date of Patent: Feb. 13, 2024

(54) VEHICLE WARNING SYSTEM

(71) Applicant: TOYOTA JIDOSHA KABUSHIKI KAISHA, Aichi-ken (JP)

(72) Inventors: Masaki Kato, Kawasaki (JP); Yasuhiro Miura, Owariasahi (JP); Tomohiro Inada, Kariya (JP); Hitoshi Muraki, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/888,481

(22) Filed: Aug. 16, 2022

(65) Prior Publication Data

US 2023/0061424 A1    Mar. 2, 2023

(30) Foreign Application Priority Data

Aug. 31, 2021    (JP) .................................. 2021-141918

(51) Int. Cl.
| | | |
|---|---|---|
| *B60W 50/14* | (2020.01) | |
| *G06T 7/70* | (2017.01) | |
| *G06V 20/59* | (2022.01) | |
| *G06F 3/01* | (2006.01) | |
| *G06F 3/14* | (2006.01) | |
| *G02C 7/04* | (2006.01) | |
| *G02B 27/01* | (2006.01) | |

(52) U.S. Cl.
CPC ......... *B60W 50/14* (2013.01); *G02B 27/0172* (2013.01); *G02C 7/04* (2013.01); *G06F 3/013* (2013.01); *G06F 3/14* (2013.01); *G06T 7/70* (2017.01); *G06V 20/597* (2022.01); *B60W 2050/143* (2013.01); *B60W 2050/146* (2013.01); *G02B 2027/014* (2013.01); *G02B 2027/0138* (2013.01); *G02B 2027/0141* (2013.01); *G06T 2207/30201* (2013.01); *G06T 2207/30268* (2013.01)

(58) Field of Classification Search
CPC combination set(s) only.
See application file for complete search history.

(56) References Cited

FOREIGN PATENT DOCUMENTS

| JP | H761257 A | 3/1995 |
|---|---|---|
| JP | H769092 A | 3/1995 |
| JP | 200283400 A | 3/2002 |
| JP | 202187621 A | 6/2021 |

*Primary Examiner* — Thomas S McCormack
(74) *Attorney, Agent, or Firm* — HAUPTMAN HAM, LLP

(57) ABSTRACT

A determination unit that determines whether a driver of a vehicle is dozing or looking away based on a state of the driver, a smart contact lens worn on an eyeball of the driver, and a display control unit that causes the smart contact lens to display a warning when the determination unit determines that the driver is dozing or looking away are provided.

7 Claims, 6 Drawing Sheets

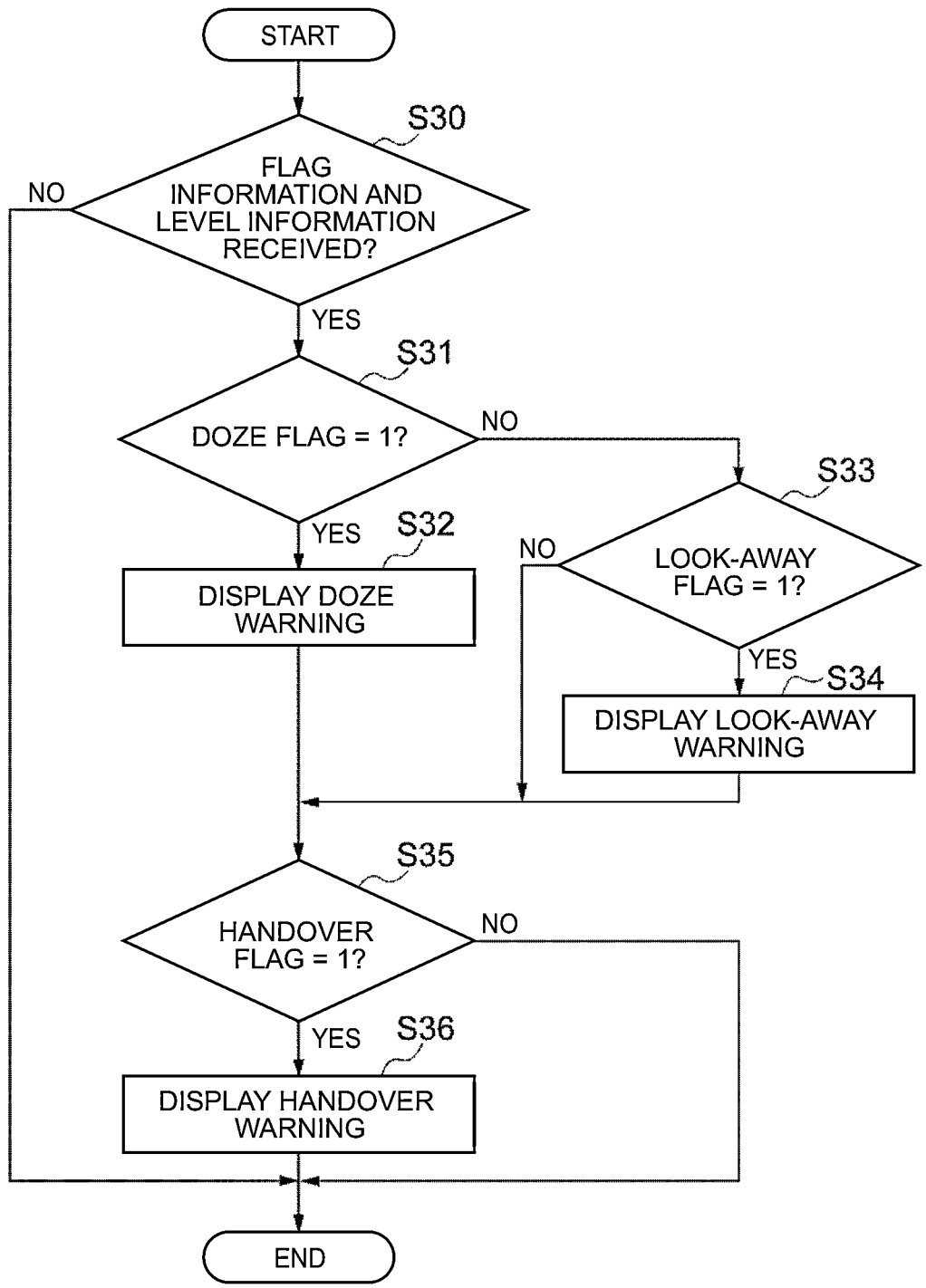

VEHICLE WARNING SYSTEM

CROSS-REFERENCE TO RELATED APPLICATION

This application claims priority to Japanese Patent Application No. 2021-141918 filed on Aug. 31, 2021, incorporated herein by reference in its entirety.

BACKGROUND

1. Technical Field

The present disclosure relates to a vehicle warning system.

2. Description of Related Art

Japanese Unexamined Patent Application Publication No. 07-069092 (JP 07-069092A) discloses a vehicle warning system in which a head-up display displays a warning when a driver is determined to be dozing.

SUMMARY

In the disclosure disclosed in JP 07-069092 A, when the head-up display displays a warning, the driver who is dozing may not visually recognize the displayed warning.

In consideration of the above fact, it is an object of the present disclosure to obtain a vehicle warning system capable of causing a driver to visually recognize a displayed warning for warning that the driver is dozing or looking away when the driver is dozing or looking away.

A vehicle warning system according to at least one embodiment includes: a determination unit that determines whether a driver of a vehicle is dozing or looking away based on a state of the driver; a smart contact lens worn on an eyeball of the driver; and a display control unit that causes the smart contact lens to display a warning when the determination unit determines that the driver is dozing or looking away.

In the vehicle warning system according to at least one embodiment, when the determination unit determines that the driver is dosing or looking away, the display control unit causes the smart contact lens to display a warning. Even in the case where the driver closes the eyelids or looks away, the driver visually recognizes the displayed warning when the smart contact lens displays a warning. That is, there is little possibility that the driver does not notice the displayed warning.

The vehicle warning system according to at least one embodiment further includes a camera that is able to capture an image of a face of the driver. When the determination unit determines that eyelids of the driver are closed for a certain period of time or longer based on captured image data of the camera, the determination unit determines that the driver is dozing.

According to at least one embodiment, when the determination unit determines that the eyelids of the driver are closed for a certain period of time or longer based on the captured image data of the camera, the determination unit determines that the driver is dozing. Therefore, the accuracy of the doze determination by the determination unit is increased. Accordingly, the possibility that the smart contact lens worn by the driver who is not dozing displays a warning is reduced, whereby the driver is less likely to feel annoyed.

In the vehicle warning system according to at least one embodiment, the determination unit determines a degree of arousal of the driver, and a content of the warning that the display control unit causes the smart contact lens to display is changed corresponding to the degree of arousal of the driver determined by the determination unit.

According to at least one embodiment, for example, when the degree of arousal is low, it is possible to display a warning that can apply a stronger stimulus to the driver on the smart contact lens, as compared with the case where the degree of arousal is high. That is, the smart contact lens can display an appropriate warning corresponding to the degree of arousal.

The vehicle warning system according to at least one embodiment further includes a camera that is able to capture an image of a face of the driver. The determination unit determines that the driver is looking away when the determination unit determines that the driver is looking in a direction different from a predetermined direction for a certain period of time or longer based on captured image data of the camera.

According to at least one embodiment, when the determination unit determines that the driver is looking away when the determination determines that the driver is looking in the direction different from the predetermined direction for a certain period of time or longer based on the captured image data of the camera. Therefore, the accuracy of the look-away determination by the determination unit is increased. Therefore, the possibility that the smart contact lens worn by the driver who is not looking away displays a warning is reduced, whereby the driver is less likely to feel annoyed.

In the vehicle warning system according to at least one embodiment, the determination unit determines a look-away level indicating a level that the driver is looking away, and a content of the warning that the display control unit causes the smart contact lens to display is changed corresponding to the look-away level determined by the determination unit.

According to at least one embodiment, for example, when the look-away level is high, it is possible to display a warning that can apply stronger stimulus to the driver on the smart contact lens, as compared with the case where the look-away level is low. That is, the smart contact lens can display an appropriate warning corresponding to the look-away level.

In the vehicle warning system according to at least one embodiment, when the determination unit determines that the vehicle is in a travelable state and the driver is dozing or looking away, the display control unit causes the smart contact lens to display the warning.

According to at least one embodiment, when the vehicle is in a non-travelable state (when the ignition switch or the start button is in the OFF state), the smart contact lens does not display a warning, whereby the driver is less likely to feel annoyed.

In the vehicle warning system according to at least one embodiment, the display control unit causes the smart contact lens to display the warning only when the vehicle does not execute driver support control at a first predetermined level that does not require the driver to perform a driving operation.

According to at least one embodiment, the smart contact lens displays a warning only when the vehicle does not execute the driver support control at the first predetermined level that does not require the driver to perform the driving operation. Therefore, the smart contact lens does not display a warning when the driver does not need to perform the driving operation, whereby the driver is less likely to feel annoyed.

In the vehicle warning system according to at least one embodiment, when the vehicle that is executing driver support control at a second predetermined level interrupts the driver support control, the display control unit causes the smart contact lens to display a warning to notify that the driver support control is interrupted.

According to at least one embodiment, when the vehicle that is executing the driver support control at the second predetermined level interrupts the driver support control, the smart contact lens display a warning to notify that the driver support control is interrupted. Therefore, even in the case where the driver closes the eyes, the driver can recognize the displayed warning, and the driver can quickly transition to the state to execute the manual operation.

As described above, the vehicle warning system according to the present disclosure has an excellent effect that the vehicle warning system can cause the driver to visually recognize the displayed warning for warning that the driver is dozing or looking away when the driver is dozing or looking away.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing a process executed by the control unit of the smart contact lens.

DETAILED DESCRIPTION OF EMBODIMENTS

Hereinafter, an embodiment of a vehicle warning system 10 (hereinafter, simply referred to as a system 10) according to the present disclosure will be described with reference to the drawings.

Figure 1:
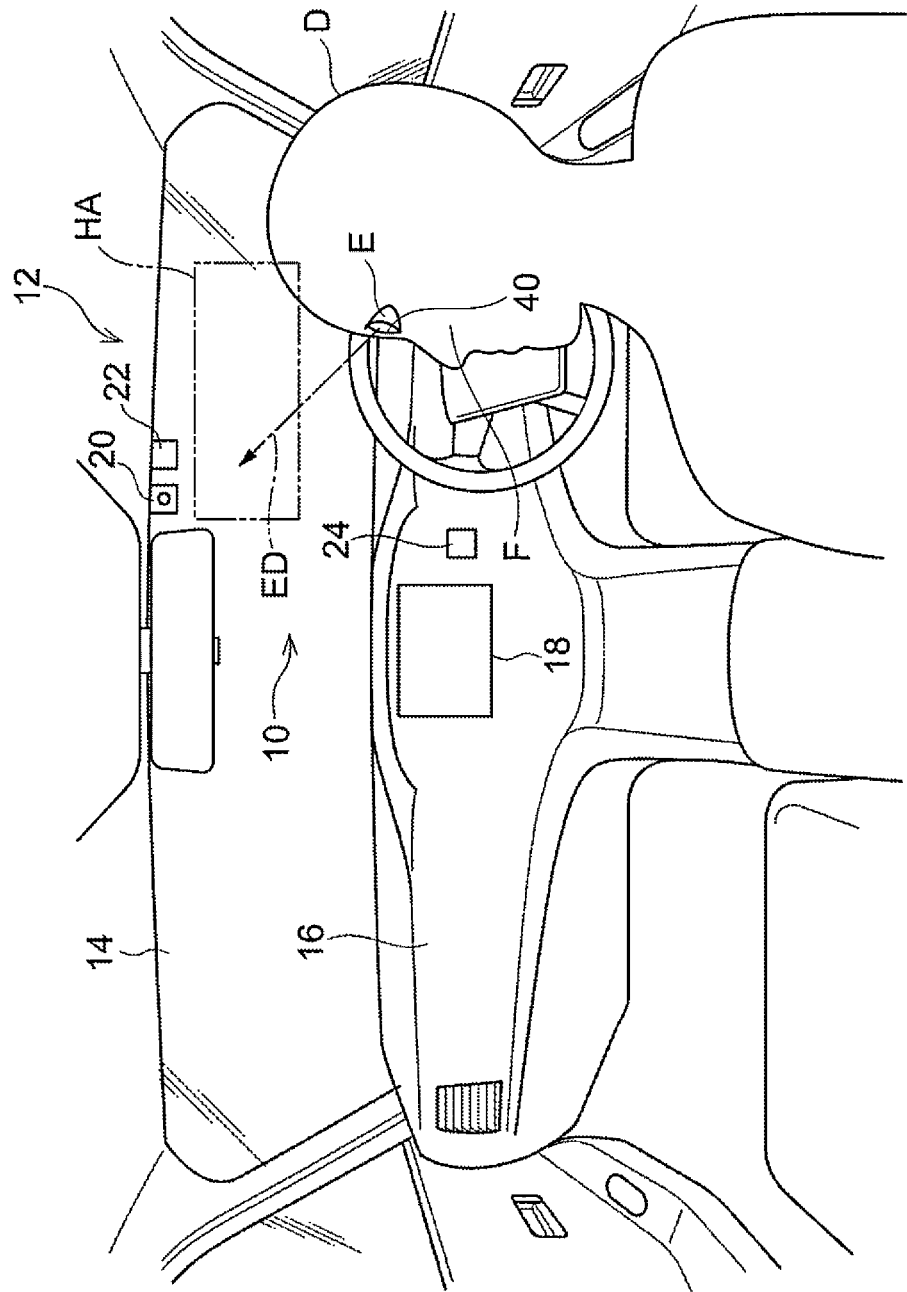
FIG. 1 is a diagram showing the inside of a vehicle provided with a vehicle warning system according to an embodiment.

A vehicle 12 equipped with some components of the system 10 according to the present embodiment includes a front windshield 14 and an instrument panel 16 as shown in FIG. 1. The instrument panel 16 is provided with a display 18 and a driver support switch 24. A line-of-sight camera (camera) 20 and an external camera 22 are provided in the upper portion of the vehicle cabin side surface of the front windshield 14. A lens 21 is provided on the rear surface of the line-of-sight camera 20. The line-of-sight camera 20 can capture an image of a subject located behind of the line-of-sight camera 20 in the vehicle front-rear direction. For example, the line-of-sight camera 20 can capture an image of a face F of a driver D seated on a driver seat. The line-of-sight camera 20 according to the present embodiment includes an infrared lighting device and an infrared camera. The infrared lighting device irradiates the face F of the driver D and its surroundings with infrared rays, and the infrared camera captures the image of the face F of the driver D and its surroundings. A lens (not shown) is provided on the front surface of an external camera 22. The external camera 22 can capture an image of a subject located in front of the external camera 22 in the vehicle front-rear direction. The driver support switch 24 is a switch for causing the vehicle 12 to execute driver support control that will be described later.

Figure 2:
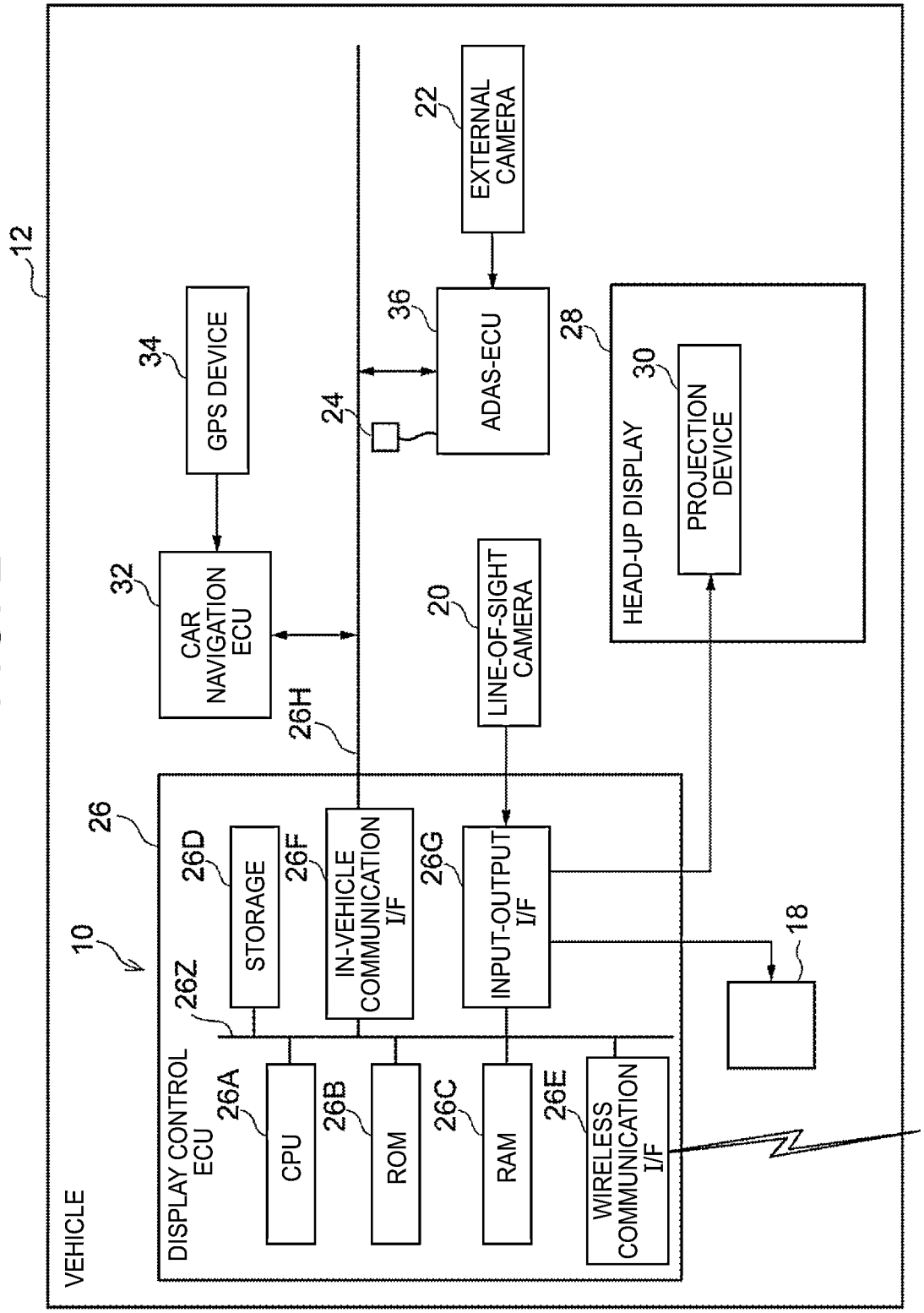
FIG. 2 is a diagram showing a hardware configuration of the vehicle shown in FIG. 1.

As shown in FIG. 2, the vehicle 12 includes, as a hardware configuration, a display control electronic control unit (ECU) 26, a head-up display (hereinafter, referred to as HUD) 28, and a car navigation ECU 32, a global positioning system (GPS) device 34 and an advanced driver assistance system (ADAS)-ECU 36, in addition to the line-of-sight camera 20, the external camera 22, and the driver support switch 24.

The display control ECU 26 is configured to include a central processing unit (CPU) 26A, a read-only memory (ROM) 26B, a random access memory (RAM) 26C, a storage 26D, a wireless communication interface (I/F) 26E, an in-vehicle communication I/F 26F, and an input-output I/F 26G. The CPU 26A, the ROM 26B, the RAM 26C, the storage 26D, the wireless communication I/F 26E, the in-vehicle communication I/F 26F, and the input-output I/F 26G are connected to each other so as to be able to communicate with each other via an internal bus 26Z.

The CPU 26A is a central arithmetic processing unit that executes various programs and controls each unit. The CPU 26A reads the program from the ROM 26B or the storage 26D, and executes the program using the RAM 26C as a work area. The CPU 26A controls each of the above components and performs various arithmetic processes in accordance with the program recorded in the ROM 26B or the storage 26D.

The ROM 26B stores various programs and various data. The RAM 26C temporarily stores a program or data as a work area. The storage 26D is composed of a storage device such as a hard disk drive (HDD) or a solid state drive (SSD), and stores various programs and various data.

The RAM 26C temporarily stores a program or data as a work area.

The wireless communication I/F 26E is an interface for performing wireless communication with various devices. For example, the wireless communication I/F 26E can wirelessly communicate with a smart contact lens 40 that will be described later. For the wireless communication I/F 26E, communication standards such as Bluetooth (registered trademark) and Wi-Fi (registered trademark) are used.

The in-vehicle communication I/F 26F is an interface for connecting the car navigation ECU 32 and the ADAS-ECU 36 via an external bus 26H. For the interface, for example, a communication standard based on the controller area network (CAN) protocol is used.

The input-output I/F 26G is an interface for communicating with the line-of-sight camera 20 and the HUD 28.

Figure 3:
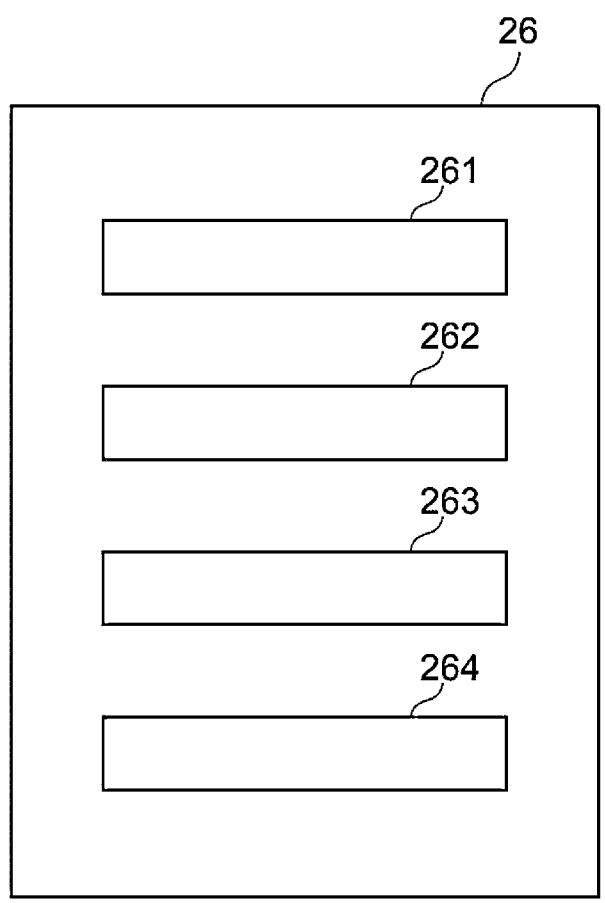
FIG. 3 is a functional block diagram of a display control electronic control unit (ECU) of the vehicle.

FIG. 3 shows an example of a functional configuration of the display control ECU 26 in a block diagram. The display control ECU 26 includes a doze determination unit (determination unit) 261, a look-away determination unit (determination unit) 262, a display control unit 263, and a communication control unit 264 as functional configurations. The doze determination unit 261, the look-away determination unit 262, the display control unit 263, and the communication control unit 264 are realized as the CPU 26A reads and executes the program stored in the ROM 26B.

The doze determination unit 261 determines a degree of arousal of the driver D based on the state of the face F of the driver D and the like included in the captured image data captured by the line-of-sight camera 20. For example, the doze determination unit 261 measures the degree to which the eyelids of the driver D are open and the cycle of opening and closing the eyelids from the image around eyeballs E of the driver D. Further, the doze determination unit 261 estimates the degree of arousal of the driver D based on the degree of opening of the eyelids of the driver D and the cycle of opening and closing the eyelids. That is, the doze determination unit 261 determines whether the driver D is in an awake state or a sleep state. The doze determination unit 261 according to the present embodiment determines that the driver D is in the sleep state only when the eyelids of the driver D are continuously closed for a length of time equal to or longer than a first threshold value. The first threshold value is recorded in the ROM 26B or the storage 26D. The first threshold value is, for example, five seconds.

Further, the doze determination unit 261 determines a sleep level when the doze determination unit 261 determines that the driver D is in the sleep state. The sleep levels in the present embodiment are levels 1 to 3. The sleep level increases in the order of the levels 1, 2, and 3. That is, among the levels 1, 2, and 3, the sleep level of the level 3 is the highest. In other words, among the levels 1, 2, and 3, the sleep depth at the level 3 is the deepest.

When the look-away determination unit 262 receives the captured image data from the line-of-sight camera 20, the look-away determination unit 262 performs image processing on the subject image data. Then, the look-away determination unit 262 calculates (detects) a line-of-sight ED of the driver D (see the alternate long and short dash line in FIG. 1) using, for example, the methods disclosed in Japanese Unexamined Patent Application Publication No. 2002-83400 (JP 2002-83400 A) and Japanese Unexamined Patent Application Publication No. 7-61257 (JP 7-61257 A). As shown in FIG. 1, when the driver D is looking forward, the line-of-sight ED extends forward from the driver D and passes through the front windshield 14 to the front side. On the other hand, for example, when the driver D is looking at the side (right side or left side) of the vehicle, the line-of-sight ED extends laterally from the driver D.

Further, the look-away determination unit 262 determines whether the driver D is looking away based on the line-of-sight ED. For example, when the line-of-sight ED is along a reference direction (predetermined direction), the look-away determination unit 262 determines that the driver D is looking in the correct direction. Here, the reference direction includes a direction extending forward (horizontally) from the eyeballs E of the driver D, and a direction extending in a direction deviated from the front to at least one of the right-left direction and the up-down direction within a predetermined range. On the other hand, for example, when the line-of-sight ED is along a direction deviated from the reference direction, the look-away determination unit 262 determines that the driver D is looking away while driving. For example, when the line-of-sight ED of the driver D extends toward the left side of the vehicle 12, the look-away determination unit 262 determines that the driver D is looking away while driving. Further, the look-away determination unit 262 according to the present embodiment determines that the driver D is looking away when a duration of the state in which the line-of-sight ED of the driver D is along the direction deviated from the reference direction is a second threshold value or more. Note that, the second threshold value is recorded in the ROM 26B or the storage 26D. The second threshold value is, for example, five seconds.

Further, the look-away determination unit 262 calculates a look-away level when the look-away determination unit 262 determines that the driver D is looking away while driving. That is, the look-away determination unit 262 calculates a look-away level based on the amount of deviation between the line-of-sight ED and the reference direction. As the amount of deviation increases, the look-away level becomes larger. The look-away levels in the present embodiment are levels 1 to 3. The look-away level increases in the order of the levels 1, 2, and 3. That is, among the levels 1, 2, and 3, the look-away level at the level 3 is the highest.

The display control unit 263 controls the display 18 and the HUD 28.

The communication control unit 264 controls the wireless communication I/F 26E and the in-vehicle communication I/F 26F.

The HUD 28 includes a projection device 30. Images projected from the projection device 30 are reflected forward by a mirror (not shown), whereby various images are displayed in a display area HA (see FIG. 1) provided at a position in front of the front windshield 14 by a predetermined distance.

The car navigation ECU 32 controls the car navigation system. A GPS device 34 is connected to the car navigation ECU 32. The GPS device 34 includes a GPS antenna (not shown) that receives a signal from a GPS satellite.

The external camera 22 is connected to the ADAS-ECU 36. Further, as a sensor group used for detecting the surrounding environment of the vehicle 12, a millimeter wave radar that transmits an exploration wave and receives a reflected wave, laser imaging detection and ranging (LIDAR) that scans the area in front of the vehicle 12, and the like are connected to the ADAS-ECU 36. Further, the ADAS-ECU 36 is connected to various actuators for driving a brake device, a steering device, and an internal combustion engine (drive source). The ADAS-ECU 36 may be connected to an electric motor (drive source).

The ADAS-ECU 36 controls the actuator group (and the electric motor) described above, whereby the vehicle 12 can execute the driver support control. The "driver support control" in the present specification and claims includes driver support control of Levels 1 to 5 defined by the Society of Automotive Engineers (SAE). For example, the driver support control at Level 1 includes adaptive cruise control (ACC), and the driver support control at Level 2 includes lane change assist. The driver support control at Level 3 is control in which the system of the vehicle 12 including the ADAS-ECU 36 performs all the driving operations under a certain condition, and requests the driver D to perform the driving operations in the event of an emergency. The driver support control at Level 5 is so-called fully autonomous driving control. The driver support switch 24 transitions between an ON state and an OFF state when the driver support switch 24 is operated by the occupant. The initial state of the driver support switch 24 is the OFF state. When the driver support switch 24 is placed in the ON state, the vehicle 12 can execute the driver support control. Further, by operating the driver support switch 24 in the ON state, the occupant can cause the vehicle 12 to execute the driver support control of any selected level from Levels 1 to 5.

Further, the ADAS-ECU 36 interrupts the driver support control that is being executed when the ADAS-ECU 36 determines that the driver support control that is being executed needs to be interrupted. For example, it is assumed that the vehicle 12 moves from the lane in which the vehicle 12 is traveling to the adjacent lane by lane change assist when the driver support control that causes the vehicle 12 to travel along the traveling route set by the car navigation system is being executed. In this case, for example, when a traffic jam occurs in the adjacent lane, the ADAS-ECU 36 determines that the lane change by the lane change assist cannot be executed, and interrupts the lane change assist. In this case, the driver D manually moves the vehicle 12 to the adjacent lane. In the present specification, interruption of the currently executed driver support control by the ADAS-ECU 36 when a certain condition is satisfied is referred to as a handover process. The handover process by the ADAS-ECU 36 also occurs during the driver support control at levels other than Level 2. For example, the ADAS-ECU 36 may execute the handover process during the driver support control at Level 3.

The ADAS-ECU 36 transmits information related to the level of the driver support control selected by the driver support switch 24 and information related to the handover process to the display control ECU 26.

Figure 4:
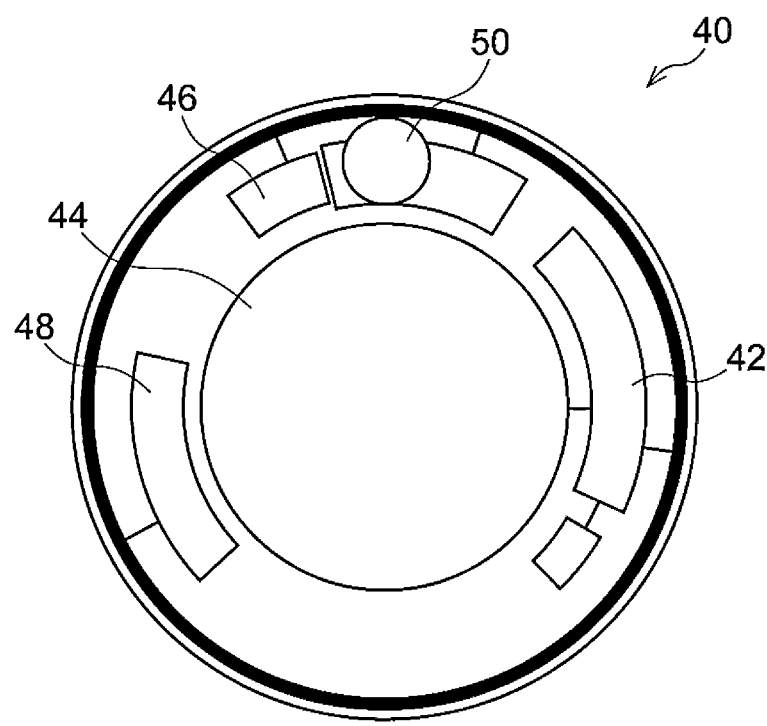
FIG. 4 is a schematic diagram showing a smart contact lens that is a component of the vehicle warning system.

As shown in FIG. 1, the smart contact lens 40 is a wearable device that is detachably attached to the eyeball E of the driver D. As shown in FIG. 4, the smart contact lens 40 includes a control unit 42, a display unit 44, a power supply unit 46, and a communication unit 48. The smart contact lens 40 is preferably worn on each of the eyeballs E of the driver D, but may be worn on only one eyeball E of the driver D.

The control unit 42 controls the display unit 44, the power supply unit 46, and the communication unit 48. The control unit 42 is configured as a microcomputer provided with a CPU, a ROM, and a RAM.

The image data is recorded in the ROM of the control unit 42. This image data includes various data. For example, the image data includes warning image data. Further, the warning image data includes, for example, warning image data 1 to 7 shown below. The warning image data 1 to 7 are image data including the following texts, respectively.

Warning image data 1 to 3: Be careful not to doze.
Warning image data 4 to 6: Be careful not to look away.
Warning image data 7: Please perform manual driving.

Although the same text is included in the warning image data 1 to 3, the stimulus received by the driver D when the driver D visually recognizes the warning image data 1 to 3 increases in the order of the warning image data 1, 2, and 3. That is, among the warning image data 1, 2, and 3, the visual stimulus applied to the driver D by the warning image data 3 is the largest. For example, the warning image data 2 is image data having a different color from that of the warning image data 1. For example, the warning image data 3 is image data displayed while blinking.

Although the same text is included in the warning image data 4 to 6, the stimulus received by the driver D when the driver D visually recognizes the warning image data 4 to 6 increases in the order of the warning image data 4, 5, and 6. That is, among the warning image data 4, 5, and 6, the visual stimulus applied to the driver D by the warning image data 6 is the largest. For example, the warning image data 5 is image data having a different color from that of the warning image data 4. For example, the warning image data 6 is image data displayed while blinking.

Figure 5:
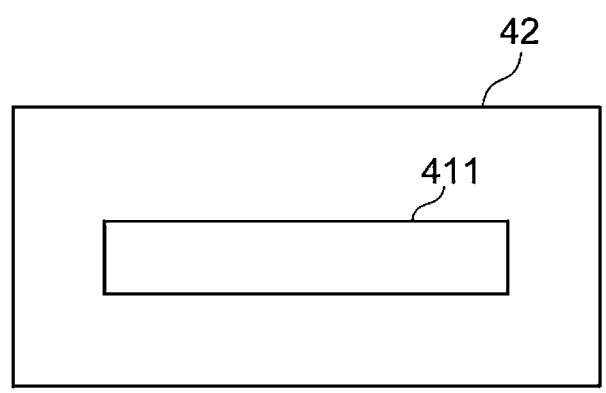
FIG. 5 is a functional block diagram of a control unit of the smart contact lens.

FIG. 5 shows an example of the functional configuration of the control unit 42 of the smart contact lens 40 in a block diagram. The control unit 42 includes at least a display control unit 411 as a functional configuration. The display control unit 411 is realized as the CPU of the control unit 42 reads and executes the program stored in the ROM.

The display control unit 411 controls the display unit 44. That is, as will be described later, the display control unit 411 controls the display unit 44 to cause the display unit 44 to display images based on various image data.

The display unit 44 displays the image represented by the image data recorded in the ROM. The display unit 44 according to the present embodiment is a transmissive display, and includes at least a plurality of light emitting elements and a plurality of light receiving elements for detecting a line of sight. The light receiving elements receive light reflected by the surface of the eyeball of the occupant. The driver D who wears the smart contact lens 40 can visually recognize the image displayed by the display unit 44. Further, the driver D can visually recognize the image displayed by the display unit 44 even when the eyelids are closed.

The power supply unit 46 is a drive source for driving the control unit 42, the display unit 44, and the communication unit 48.

The communication unit 48 can wirelessly communicate with an external device. For example, the communication unit 48 can wirelessly communicate with the wireless communication I/F 26E of the display control ECU 26. A short-range wireless communication standard such as Bluetooth (registered trademark) is applied to the communication unit 48.

The line-of-sight camera 20, the display control ECU 26, and the smart contact lens 40 described above are the components of the system 10 according to the present embodiment.

Operations and Effects

Next, operations and effects of the present embodiment will be described.

Subsequently, the process executed by the display control ECU 26 of the vehicle 12 and the control unit 42 of the smart contact lens 40 will be described with reference to the flowcharts in FIGS. 6 and 7. It is assumed that the driver D wears the smart contact lens 40 on at least one eyeball E.

Figure 6:
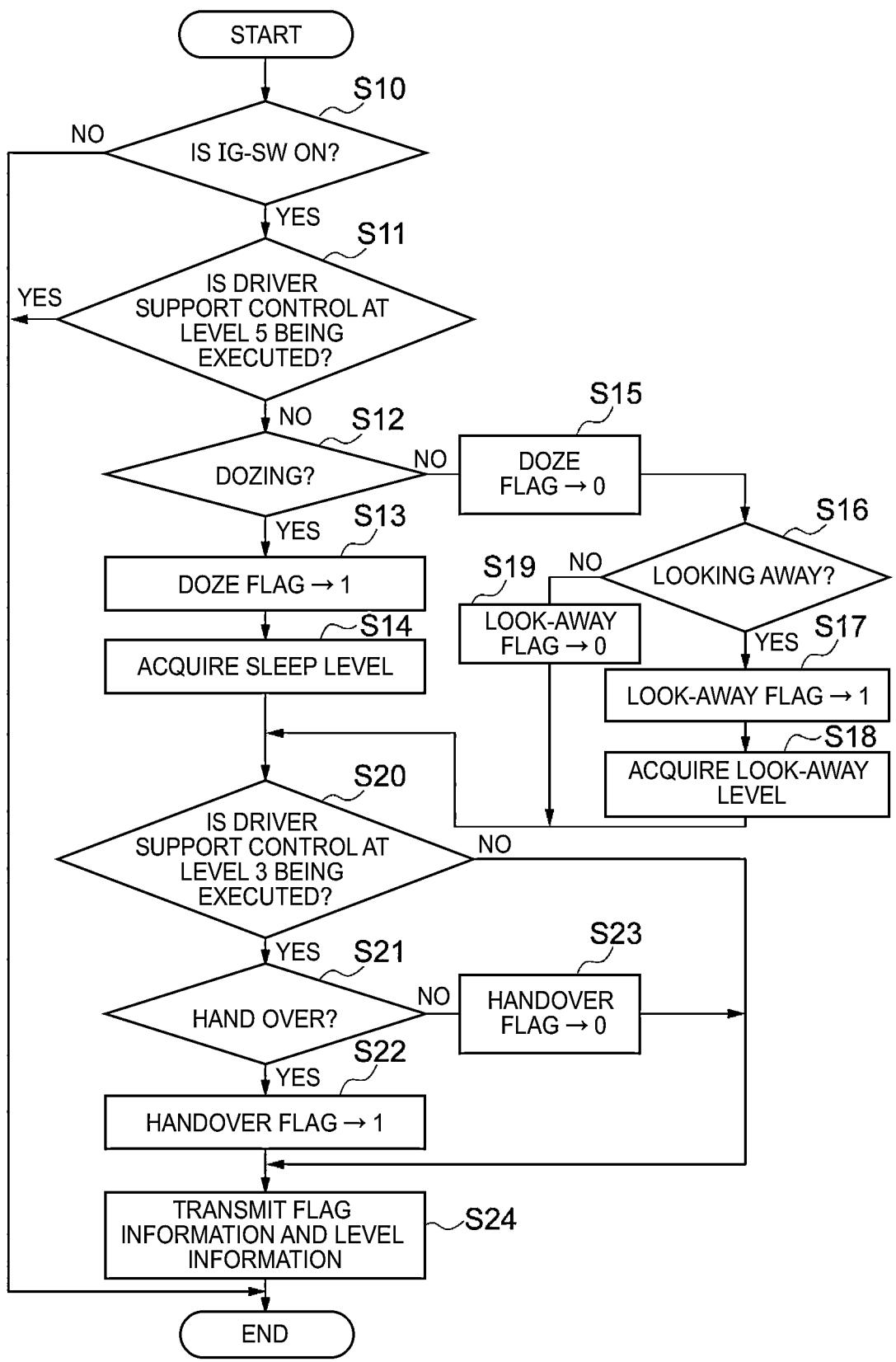
FIG. 6 is a flowchart showing a process executed by the vehicle display control ECU.

The display control ECU 26 repeatedly executes the process of the flowchart shown in FIG. 6 every time a predetermined time elapses.

In step S10, the display control unit 263 of the display control ECU 26 determines whether the ignition switch (or start button) (both not shown) provided in the vehicle 12 is in the ON state. In other words, the display control unit 263 determines whether the vehicle 12 is in a travelable state. The ignition switch (or start button) is connected to the display control ECU 26, and the display control unit 263 can detect whether the ignition switch (or start button) is in the ON state. When the determination result is Yes in step S10, the display control ECU 26 proceeds to step S11.

In step S11, the display control unit 263 determines whether the vehicle 12 is executing the driver support control (fully autonomous driving control) at Level 5 (first predetermined level) based on the information received from the ADAS-ECU 36. When the determination result is No in step S11, the display control ECU 26 proceeds to step S12.

In step S12, the doze determination unit 261 of the display control ECU 26 determines whether the driver D is in the sleep state based on the captured image data received from the line-of-sight camera 20.

When the determination result is Yes in step S12, the display control ECU 26 proceeds to step S13, and the doze determination unit 261 sets the value of a doze flag to "1". Note that, the initial value of the doze flag is "0".

The display control ECU 26 that has completed the process in step S13 proceeds to step S14, and the doze determination unit 261 acquires the sleep level of the driver D.

When the determination result is No in step S12, the display control ECU 26 proceeds to step S15, and the doze determination unit 261 sets the value of the doze flag to "0".

The display control ECU 26 that has completed the process in step S15 proceeds to step S16, and the look-away determination unit 262 determines whether the driver D is looking away based on the captured image data received from the line-of-sight camera 20.

When the determination result is Yes in step S16, the display control ECU 26 proceeds to step S17, and the look-away determination unit 262 sets the value of a look-away flag to "1". Note that, the initial value of the look-away flag is "0".

The display control ECU 26 that has completed the process in step S17 proceeds to step S18, and the look-away determination unit 262 acquires the look-away level of the driver D.

When the determination result is No in step S16, the display control ECU 26 proceeds to step S19, and the look-away determination unit 262 sets the value of the look-away flag to "0".

When the process in step S14, S18 or S19 is completed, the display control ECU 26 proceeds to step S20, and the display control unit 263 determines whether the vehicle 12 is executing the driver support control at Level 3 (second predetermined level) based on the information received from the ADAS-ECU 36.

When the determination result is Yes in step S20, the display control ECU 26 proceeds to step S21, and the display control unit 263 determines whether the ADAS-ECU 36 has executed the handover process based on the information received from the ADAS-ECU 36.

When the determination result is Yes in step S21, the display control ECU 26 proceeds to step S22, and the display control unit 263 sets the value of a handover flag to "1". Note that, the initial value of the handover flag is "0". When the determination result is No in step S21, the display control ECU 26 proceeds to step S23, and the display control unit 263 sets the value of the handover flag to "0".

When the process in step S22 or S23 is completed, the display control ECU 26 proceeds to step S24, and the communication control unit 264 controls the wireless communication I/F 26E. With the above, flag information that is the information related to the doze flag, the look-away flag, and the handover flag, and level information that is the information related to the sleep level and the look-away level are wirelessly transmitted to the smart contact lens 40 by the wireless communication I/F 26E.

When the determination result is No in step S10, the determination result is Yes in step S11, or the process in step S24 is completed, the display control ECU 26 temporarily ends processing of the flowchart in FIG. 6.

The control unit 42 of the smart contact lens 40 repeatedly executes processing of the flowchart shown in FIG. 7 every time a predetermined time elapses.

In step S30, the control unit 42 determines whether the communication unit 48 of the smart contact lens 40 has received the flag information and the level information from the wireless communication I/F 26E.

When the determination result is Yes in step S30, the control unit 42 proceeds to step S31 and determines whether the value of the received doze flag is "1".

When the determination result is Yes in step S31, the control unit 42 proceeds to step S32, and the display control unit 411 controls the display unit 44 to cause the display unit 44 to display an image based on the warning image data. At this time, the display control unit 411 selects the warning image data based on the magnitude of the sleep level. That is, when the sleep level is the sleep level 1, the display control unit 411 selects the warning image data 1. When the sleep level is the sleep level 2, the display control unit 411 selects the warning image data 2. When the sleep level is the sleep level 3, the display control unit 411 selects the warning image data 3.

When the determination result is No in step S31, the control unit 42 proceeds to step S33 and determines whether the value of the received look-away flag is "1".

When the determination result is Yes in step S33, the control unit 42 proceeds to step S34, and the display control unit 411 controls the display unit 44 to cause the display unit 44 to display an image based on the warning image data. At this time, the display control unit 411 selects the warning image data based on the magnitude of the look-away level. That is, when the look-away level is the look-away level 1, the display control unit 411 selects the warning image data 4. When the look-away level is the look-away level 2, the display control unit 411 selects the warning image data 5. When the look-away level is the look-away level 3, the display control unit 411 selects the warning image data 6.

When the process in step S32 or step S34 is completed, or when the determination result is No in step S33, the control unit 42 proceeds to step S35 and determines whether the value of the received handover flag is "1".

When the determination result is Yes in step S35, the control unit 42 proceeds to step S36, and the display control unit 411 controls the display unit 44 to cause the display unit 44 to display an image based on the warning image data 7.

When the determination result is No in step S30 or in step S35 or the process in step S36 is completed, the control unit 42 temporarily ends the processing of the flowchart in FIG. 7.

As described above, when the display control ECU 26 determines that the driver D is dozing or looking away, the display control unit 411 causes the display unit 44 of the smart contact lens 40 to display a warning based on any of the warning image data 1 to 6.

Here, it is assumed that the display 18 displays a warning and the HUD 28 forms an image indicating the warning displayed in a display area HA. Also in this case, when the driver D opens the eyelids and does not look away, the driver D can recognize the displayed warning by visually recognizing the display 18 or the display area HA. On the other hand, when the driver D closes the eyelids or looks away, the driver D cannot visually recognize the displayed warning.

On the other hand, in the present embodiment, even though the driver D closes the eyelids or looks away, the driver D visually recognize the displayed warning when the display unit 44 of the smart contact lens 40 displays the warning. Therefore, with the system 10 according to the present embodiment, there is little possibility that the driver D who closes the eyelids or looks away does not notice the displayed warning.

Further, when the ADAS-ECU 36 executes the handover process, the display unit 44 of the smart contact lens 40 displays a warning based on the warning image data 7 for prompting the driver D to perform a manual driving operation. Even when the driver D closes the eyelids or looks away, the driver D visually recognizes this displayed warning. Therefore, even when the driver D is dozing or looking away, the driver D can recognize the displayed warning, and the driver D can quickly transition to the state to execute the manual operation.

Further, according to the present embodiment, the display control ECU 26 (the doze determination unit 261) determines that the driver D is in the sleep state when the eyelids of the driver D are continuously closed for a length of time equal to or longer than the first threshold value. Further, the display control ECU 26 (the look-away determination unit 262) determines that the driver D is looking away when the duration of the state in which the line-of-sight ED of the driver D is along the direction deviated from the reference direction is the second threshold value or more. Therefore, the accuracy of the doze determination and the accuracy of the look-away determination by the display control ECU 26 (the doze determination unit 261 and look-away determination unit 262) are high. Therefore, there is little possibility that the smart contact lens 40 displays the warning when the driver D is not dozing or looking away in reality. Accordingly, the driver D is less likely to feel annoyed.

Further, in the present embodiment, as the sleep level of the driver D becomes higher (the degree of arousal becomes lower), the display unit 44 displays the warning image data 1 to 3 capable of applying a strong visual stimulus to the driver D. Similarly, as the look-away level of the driver D becomes higher, the display unit 44 displays the warning image data 4 to 6 capable of applying a strong visual stimulus to the driver D. As described above, the system 10 according to the present embodiment can cause the smart contact lens 40 to execute an appropriate display of warning corresponding to the degree of arousal (sleep level) and the look-away level of the driver D.

Further, in the present embodiment, when the vehicle 12 is in a non-travelable state (when the ignition switch or the start button is in the OFF state), the smart contact lens 40 does not display a warning. That is, even when the eyelids of the driver D are closed or the line of sight ED of the driver D is facing a direction different from the reference direction, the smart contact lens 40 does not display a warning while the vehicle 12 is not traveling. Accordingly, the driver D is less likely to feel annoyed.

Further, in the present embodiment, when the vehicle 12 is executing the fully autonomous driving control, the smart contact lens 40 does not display a warning. In other words, when the driver D does not need to perform the driving operation, the smart contact lens 40 does not display a warning. As described above, the smart contact lens 40 does not display a warning when the driver D does not need to perform the driving operation, whereby the driver D is less likely to feel annoyed.

Although the system 10 according to the embodiment have been described above, design of the system 10 can be changed as appropriate without departing from the scope of the disclosure.

For example, in the above embodiment, the display control ECU 26 includes the functions of the doze determination unit 261 and the look-away determination unit 262. However, the control unit 42 may include the functions of the doze determination unit 261 and the look-away determination unit 262. In this case, for example, the smart contact lens 40 acquires the captured image data acquired by the line-of-sight camera 20 by wireless communication, and the doze determination unit 261 and the look-away determination unit 262 included in the smart contact lens 40 execute the doze determination and the look-away determination, respectively, based on the captured image data. Note that, the control unit 42 may have only one of the functions of the doze determination unit 261 and the look-away determination unit 262.

Further, as shown in FIG. 4, the smart contact lens 40 may include a camera unit (camera) 50. The camera unit 50 can capture an image of a subject located in front of the camera unit 50. Therefore, the look-away determination unit 262 can determine whether the driver D is looking away based on the captured image data and can calculate the look-away level by analyzing the captured image data acquired by the camera unit 50. When the display control ECU 26 has the function of the look-away determination unit 262, the look-away determination unit 262 of the display control ECU 26 can execute the look-away determination based on the captured image data received from the smart contact lens 40. When the smart contact lens 40 has the function of the look-away determination unit 262, the look-away determination unit 262 of the smart contact lens 40 can execute the look-away determination based on the captured image data acquired by the camera unit 50.

Further, the look-away determination unit 262 may execute the look-away determination and the look-away level calculation based on the line of sight of the driver D detected by the light receiving element of the smart contact lens 40.

The doze determination unit 261 may determine the degree of arousal of the driver D based on the biological information (for example, heart rate or blood pressure) of the driver D acquired by a wearable device (not shown) that is attached to the body of the driver D and provided with a wireless communication function. In this case, for example, the doze determination unit 261 of the display control ECU 26 determines the degree of arousal of the driver D based on the biological information received from the wearable device. Further, when the smart contact lens 40 has the function of the doze determination unit 261, the doze determination unit 261 of the smart contact lens 40 determines the degree of arousal of the driver D based on the biological information received from the wearable device.

Regardless of whether the vehicle 12 is in a travelable state, the smart contact lens 40 may display a warning when the doze determination unit 261 determines that the driver D is dozing. Similarly, regardless of whether the vehicle 12 is in a travelable state, the smart contact lens 40 may display a warning when the look-away determination unit 262 determines that the driver D is looking away.

Regardless of whether the fully autonomous diving control is executed, the smart contact lens 40 may display a warning when the doze determination unit 261 determines that the driver D is dozing. Similarly, regardless of whether the fully autonomous diving control is executed, the smart contact lens 40 may display a warning when the look-away determination unit 262 determines that the driver D is looking away.

The texts included in the warning image data 1 to 7 may be different from the above. For example, the warning image data 1 to 3 may be image data including the text "Please open your eyes". Further, the data 4 to 6 may be image data including the text "Look ahead". Further, the data 7 may be image data including the text "Driver support control ends".

The doze determination unit 261 determines a sleep level when the driver D determines that the driver is in the sleep state. The image displayed by the display unit 44 in this case is an image based on one warning image data. Similarly, the look-away determination unit 262 may not calculate the look-away level when the look-away determination unit 262 determines that the driver D is looking away while driving.

The image displayed by the display unit 44 in this case is an image based on one warning image data.

The smart contact lens 40 may not be able to display a warning based on the warning image data 7.

The system 10 may include only one of the doze determination unit 261 and the look-away determination unit 262.

The level of the driver support control corresponding to the "first predetermined level" of the claims may be a level different from Level 5.

The level of the driver support control corresponding to the "second predetermined level" of the claims may be a level different from Level 3.

Instead of the GPS receiver 34, the vehicle 12 may include a receiver capable of receiving information from satellites of a global navigation satellite system (for example, Galileo) other than the GPS.

What is claimed is:

1. A vehicle warning system, comprising:
    a determination unit that determines whether a driver of a vehicle is dozing or looking away based on a state of the driver;
    a smart contact lens worn on an eyeball of the driver; and
    a display control unit that causes the smart contact lens to display a warning when the determination unit determines that the driver is dozing or looking away, wherein
    when the vehicle that is executing driver support control at a second predetermined level interrupts the driver support control, the display control unit causes the smart contact lens to display a further warning to notify that the driver support control is interrupted.

2. The vehicle warning system according to claim 1, further comprising a camera that is able to capture an image of a face of the driver, wherein when the determination unit determines that eyelids of the driver are closed for a certain period of time or longer based on captured image data of the camera, the determination unit determines that the driver is dozing.

3. The vehicle warning system according to claim 2, wherein:
    the determination unit determines a degree of arousal of the driver; and
    a content of the warning that the display control unit causes the smart contact lens to display is changed corresponding to the degree of arousal of the driver determined by the determination unit.

4. The vehicle warning system according to claim 1, further comprising a camera that is able to capture an image of a face of the driver, wherein the determination unit determines that the driver is looking away when the determination unit determines that the driver is looking in a direction different from a predetermined direction for a certain period of time or longer based on captured image data of the camera.

5. The vehicle warning system according to claim 4, wherein:
    the determination unit determines a look-away level indicating a level that the driver is looking away; and
    a content of the warning that the display control unit causes the smart contact lens to display is changed corresponding to the look-away level determined by the determination unit.

6. The vehicle warning system according to claim 1, wherein when the determination unit determines that the vehicle is in a travelable state and the driver is dozing or looking away, the display control unit causes the smart contact lens to display the warning.

7. A vehicle warning system [ according to claim 1], comprising:
    a determination unit that determines whether a driver of a vehicle is dozing or looking away based on a state of the driver;
    a smart contact lens worn on an eyeball of the driver; and
    a display control unit that causes the smart contact lens to display a warning only when (i) the vehicle does not execute driver support control at a first predetermined level that does not require the driver to perform a driving operation, and (ii) the determination unit determines that the driver is dozing or looking away.

* * * * *